United States Patent
Domingues et al.

(10) Patent No.: US 9,298,529 B2
(45) Date of Patent: Mar. 29, 2016

(54) INDICATING INTERNAL TRANSMITTER ERRORS IN A CONTROLLER AREA NETWORK (CAN)

(71) Applicant: Freescale Semiconductor, Inc., Austin, TX (US)

(72) Inventors: Patricia Elaine Domingues, Meridiano (BR); Frank Herman Behrens, Campinas (BR); Marcelo Marinho, Campinas (BR)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 97 days.

(21) Appl. No.: 14/290,924

(22) Filed: May 29, 2014

(65) Prior Publication Data

US 2015/0347218 A1    Dec. 3, 2015

(51) Int. Cl.
*H03M 13/00* (2006.01)
*G06F 11/07* (2006.01)

(52) U.S. Cl.
CPC ........ *G06F 11/0751* (2013.01); *G06F 11/0772* (2013.01)

(58) Field of Classification Search
CPC ............ G06F 11/0751; G06F 11/0772; H04L 12/40006; H04L 12/40013; H04L 1/1887; H04L 12/40169; H04L 12/40163; H04L 2012/40215; H04L 1/08; H04L 12/40032; H04L 12/40136; H04L 1/203; H04L 1/0007; H04L 1/0061; H04L 1/1607; H04L 2001/0094
See application file for complete search history.

(56) References Cited

U.S. PATENT DOCUMENTS

| | | | | |
|---|---|---|---|---|
| 5,027,357 | A | | 6/1991 | Yu et al. |
| 5,574,848 | A | * | 11/1996 | Thomson .......... H04L 12/40013 714/2 |
| 5,958,029 | A | * | 9/1999 | McKinnon ............ G06F 13/385 710/100 |
| 6,003,146 | A | | 12/1999 | Beutler |
| 6,115,831 | A | * | 9/2000 | Hanf ................... B60R 16/0315 714/43 |
| 8,213,321 | B2 | | 7/2012 | Butts et al. |
| 8,346,992 | B2 | | 1/2013 | Singh et al. |
| 2003/0051203 | A1 | | 3/2003 | Vasko et al. |
| 2003/0084384 | A1 | * | 5/2003 | White, III ................. H04L 1/08 714/704 |
| 2010/0150176 | A1 | * | 6/2010 | Yakashiro ......... H04L 12/40006 370/475 |
| 2013/0318380 | A1 | * | 11/2013 | Behrens .................. H04L 12/12 713/323 |
| 2014/0016654 | A1 | * | 1/2014 | Yakashiro ............. H04L 12/413 370/516 |

* cited by examiner

*Primary Examiner* — Guerrier Merant
(74) *Attorney, Agent, or Firm* — Fogarty, L.L.C.

(57) ABSTRACT

Systems and methods for indicating internal transmitter errors in a Controller Area Network (CAN). In some embodiments, a method may include initiating, by a device coupled to a CAN, transmission of a message via the CAN; detecting an error by the device during the transmission; and continuing, by the device after having detected the error, the transmission of the message without causing or indicating a bus error condition. In other embodiments, a CAN node may include message processing circuitry configured to receive a frame from a transmitter, the frame comprising a cyclic redundancy check (CRC) field, the message processing circuitry further configured to identify an internal error of the transmitter based upon the CRC field.

17 Claims, 4 Drawing Sheets

INDICATING INTERNAL TRANSMITTER ERRORS IN A CONTROLLER AREA NETWORK (CAN)

FIELD

This disclosure relates generally to network communications, and more specifically, to systems and methods for indicating internal transmitter errors in a Controller Area Network (CAN).

BACKGROUND

A Controller Area Network (CAN) is an asynchronous serial bus network that connects devices, sensors, and actuators in various control applications (e.g., automotive, industrial automation, avionics, medical and office equipment, consumer appliances, etc.). Different CAN networks have different performance characteristics. Automotive CAN networks, for example, may be divided into two distinct categories—body control and powertrain. Body control networks enable communications among passenger comfort and convenience systems, and are typically less resource-intensive than powertrain networks, which service engine and transmission control.

Over the course of the last decade, three major physical layer designs have emerged in most CAN applications. All three communicate using a differential voltage on a pair of wires and are commonly referred to as: high-speed CAN (e.g., at rates of up to 1 Mbps), low-speed CAN (e.g., at rates of up to 125 Kbps), and Flexible Data Rate (FD) CAN (e.g., up to 8 Mbps). Other CAN interfaces, however, may communicate using a single wire (e.g., at rates of up to 33.3 Kbps). Generally speaking, each node in a CAN network may be able to transmit and receive messages over a CAN bus.

In conventional CAN systems, any type of transmission error causes a message under transmission to be halted or interrupted (by a transmitting node) as soon as the error is detected by any receiving node in the CAN network. A known method for the transmitting node to prevent the reception of a message under transmission is to hold its output in a recessive or dominant state until a receiver node detects a bus error condition and issues an error frame.

The inventors hereof have recognized, however, that the foregoing method makes it difficult for a CAN system to properly discriminate the cause of the error, which in turn affects error statistics and reporting. For instance, a conventional CAN system cannot differentiate between a CAN bus error that takes place under otherwise normal communications and an error introduced by a transmitter due to its internal failure that nonetheless allows transmission of a corrupted message.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Embodiments disclosed herein are configured to provide systems and methods for indicating internal transmitter errors in a CAN. For example, a CAN transmitter may initiate transmission of a message, detect an internal transmitter error, and then continue the transmission without creating a bus error condition. Rather then holding the transmitter's output in a recessive or dominant state, for instance, the message may instead be changed to encode or otherwise indicate the transmitter's internal error, for example, by altering the cyclic redundancy check (CRC) field of the transmitted frame. On the CAN receiver side, a node may be configured to continue to verify each bit of the CRC field even after having detected what would otherwise seem to be a typical CRC error (e.g., the CRC field in the received message does not match a CRC value independently calculated by the receiver). Then, based upon the contents of the altered CRC field, the CAN receiver may be capable of discriminating or identifying the CAN transmitter's internal error as distinct from a normal bus or transmission error.

Accordingly, the systems and methods described herein enable getting a CAN transmitter's internal error to be communicated to a CAN receiver (and identified as such) by manipulating the CRC field of a transmitted message. This is in contrast with conventional techniques, whereby a transmitter, upon detecting an internal error, would simply halt an ongoing transmission and thus create an error that would otherwise be indistinguishable from other bus errors.

Although some of the examples herein are discussed in the context of automotive environments, these techniques may also be employed in other environments (e.g., industrial automation, avionics, medical and office equipment, consumer appliances, etc.).

Figure 1:
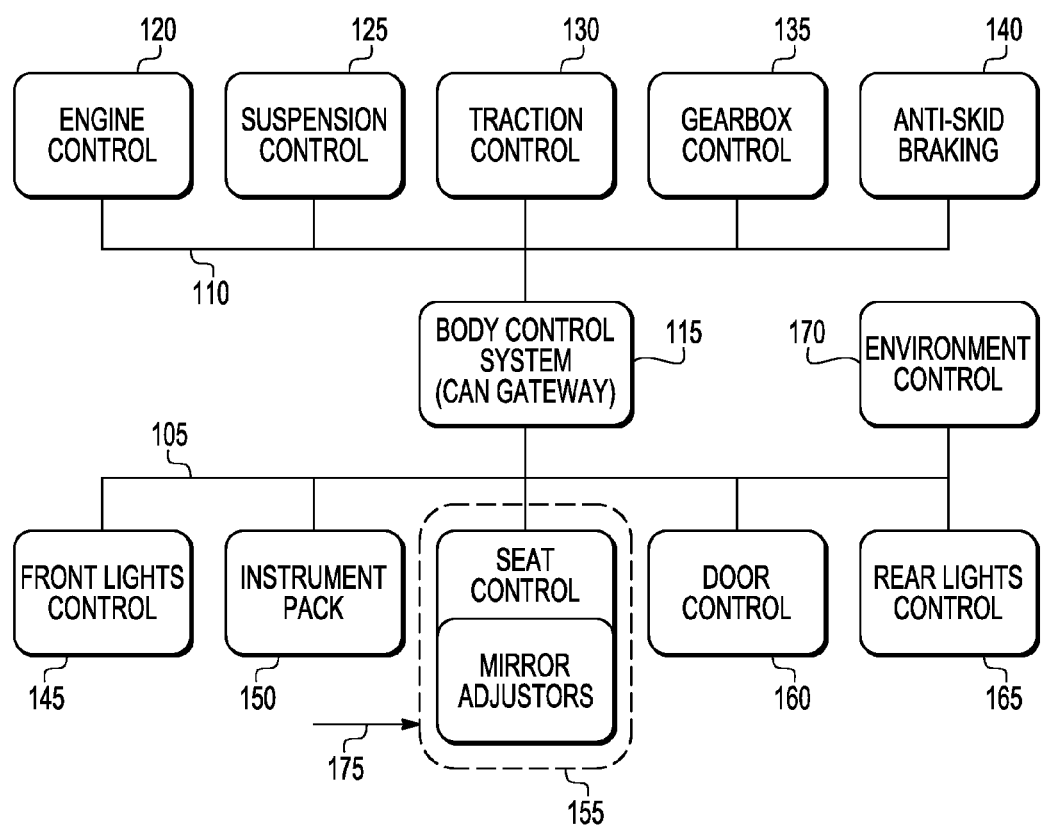
FIG. 1 is a block diagram of an example of a CAN network deployed in an automobile according to some embodiments.

Turning to FIG. 1, a block diagram of an example of a CAN network 100 deployed in an automobile is depicted. In some embodiments, one or more of nodes or devices 115-170 may be implemented, at least in part, using one or more of the systems and methods described below. As illustrated, CAN gateway 115 (e.g., body control system) is coupled to low-speed CAN bus 105 as well as high-speed CAN bus 110, and it may be configured to enable communications between nodes across the two buses. Powertrain devices or nodes coupled to high-speed CAN bus 110 include: engine control 120, suspension control 125, traction control 130, gearbox control 135, and anti-skid breaking 140. Conversely, body control devices or nodes coupled to low-speed CAN bus 105 include front lights control 145, instrument pack 150 (e.g., dashboard displays and information systems, etc.), seat/mirror control 155, door control 160 (e.g., remote lock/unlock, windows, etc.), rear lights control 165, and environment control 170 (e.g., A/C, heater, particle filter, etc.).

In some embodiments, the communication protocol used in various communications among components 120-170 may be the CAN protocol defined in the international standard ISO 11898-1. Accordingly, in some embodiments, low-speed CAN bus 105 may operate based upon the ISO 11898-3 standard and high-speed CAN bus 110 may operate based upon the ISO 11898-2 standard.

It is emphasized that automotive CAN network 100 is shown only by way of example. Other nodes or elements may be present in CAN network 100, and those elements may be connected in different ways. In some cases, one or more of nodes 115-170 may be divided into sub-nodes. For instance, the mirror control portion of seat/mirror control node 155 may be coupled to single-wire CAN interface or bus 175. In other cases, one or more of nodes 115-170 may be combined into fewer nodes. Additionally or alternatively, one or more of nodes 115-170 may be networked using a Local Interconnect Network (e.g., ISO 7498) bus or other suitable communication bus. Examples of other types of devices or nodes that may be present in CAN network 100 include, but are not limited to, airbag controls, sunroof controls, alarms, navigation systems, entertainment devices (e.g., video, audio, etc.), parking assistance modules, communication modules (e.g., cellular, Bluetooth®, Wi-Fi®, etc.), diagnostic systems (e.g., on-board diagnostics), etc.

Figure 2:
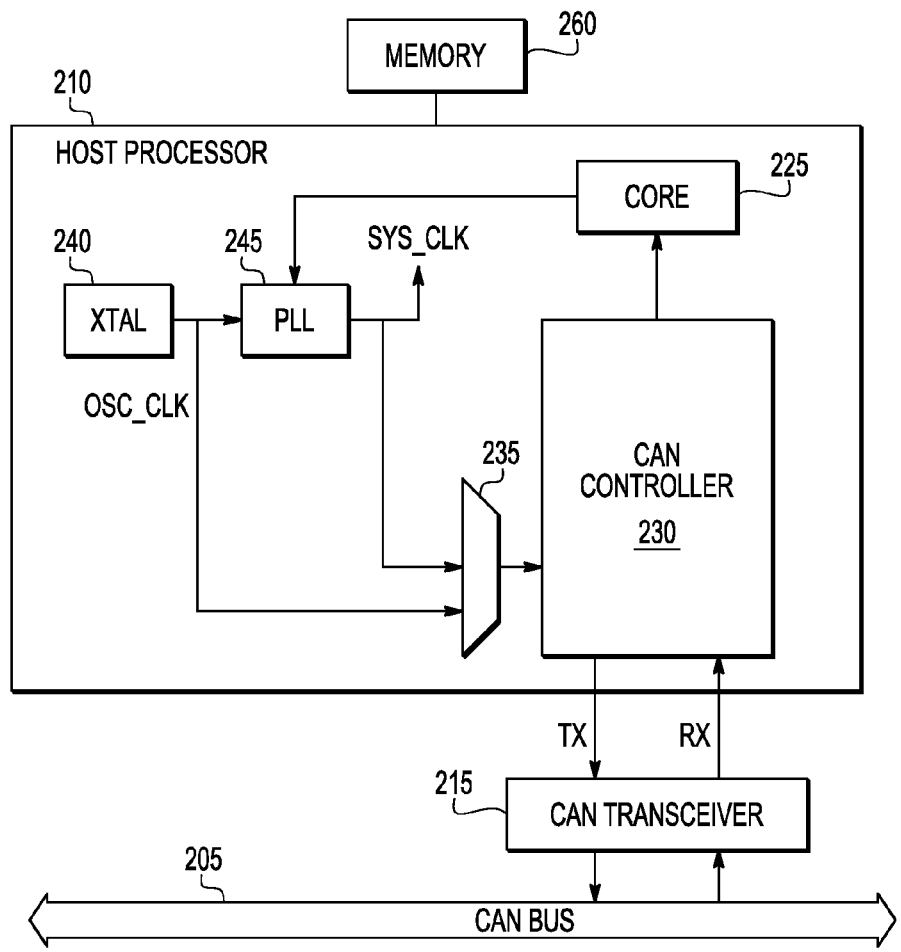
FIG. 2 is a block diagram of an example of a CAN node according to some embodiments.
Figure 3:
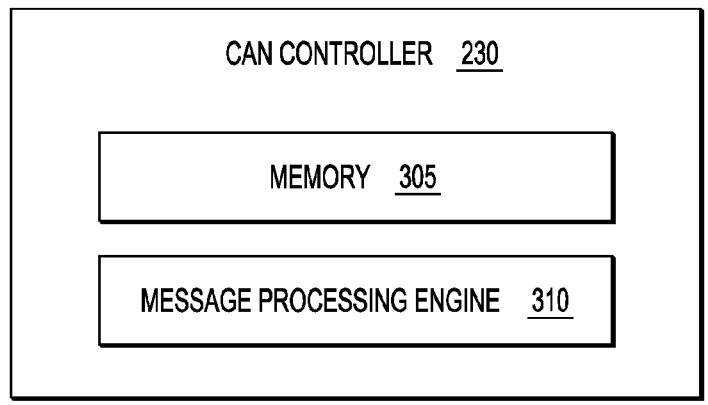
FIG. 3 is a block diagram of an example of a CAN controller according to some embodiments.

In some embodiments, each of nodes 115-170 may include one or more host processors as well as one or more sensors and/or actuators configured to perform one or more operations. In addition, nodes 115-170 may communicate with each other in a multiplexed fashion over CAN network 100, which provides a multi-master broadcast serial bus. For example, each of nodes 115-170 may include a CAN controller integrated within its host processor and/or operably coupled thereto, as illustrated in FIGS. 2 and 3. As such, nodes 115-170 may be configured to send and receive messages to each other using their respective CAN controllers, each message being serially transmitted onto the CAN bus and having an identifier (ID) portion (e.g., 11 or 29 bits) and a payload portion (e.g., 8 bytes for high or low speed CAN, or 64 bytes for Flexible Data Rate (FD) CAN).

FIG. 2 is a block diagram of an example of CAN node 200. In some embodiments, CAN node 200 may be one or more of nodes, devices, or components 115-170 in FIG. 1. As illustrated, CAN node 200 includes host processor 210, which in turn includes crystal oscillator signal source 240, phase-locked loop (PLL) circuit 245, at least one processor core 225, multiplexing or selecting circuit 235, and CAN controller 230. CAN transceiver 215 is coupled to CAN bus 205 (e.g., one of buses 105 or 110 in FIG. 1), as well as CAN controller 230. Memory 260 is coupled to host processor 210. In this diagram, portion(s) of CAN node 200 that would be specific to a given deployment (e.g., particular sensor(s) and/or actuator(s)) have been omitted for sake of simplicity, although it should be understood that any number of different peripheral devices (not shown) may be coupled to host processor 210 via any suitable interface.

The illustrative, non-limiting implementation of CAN node 200 in FIG. 2 depicts CAN controller 230 and multiplexing or selecting circuit 235 integrated into host processor 210. In other implementations, however, CAN controller 230 and multiplexing and/or selecting circuit 235 may be, at least in part, physically separate from host processor 210 but otherwise operably coupled thereto. For example, two or more host processors 210 may use a single CAN controller 230 shared among them. More generally, it should be noted that numerous variations of CAN node 200 will be apparent to a person of ordinary skill in the art in light of this description. For instance, host processor 210 may include two or more processor cores (e.g., dual-core, quad-core, etc.), memory 260 and/or CAN transceiver 215 may be at least partially integrated within host processor 210, etc.

During normal operation, host processor 210 may be configured to execute one or more instructions stored in memory 260 to thereby perform its programmed tasks. One or more of these tasks may be specific to the node's purpose(s) within CAN network 100 (e.g., traction control node 130 performs traction control tasks). Other tasks may include processing CAN messages received (RX) over CAN bus 205 through CAN transceiver 215 and CAN controller 230, and/or transmitting CAN messages (TX) over CAN bus 205 through CAN controller 230 and CAN transceiver 215. In certain implementations, CAN controller 230 may store serially received bits from CAN bus 205 until an entire CAN message is received, which may then be provided to core 225 (e.g., upon the triggering of an interrupt). Conversely, CAN controller 230 may transmit CAN messages received from core 225 serially onto CAN bus 205 in an appropriate format.

Crystal oscillator signal source 240 may provide a clock signal ("OSC_CLK") that is processed by PLL circuit 245 to generate yet another clock signal ("SYS_CLK"), which may then be used by core 225 in host processor 210.

Embodiments of host processor 210 may include, but are not limited to, application specific integrated circuits (ASICs), system-on-chip (SoC) circuits, digital signal processors (DSPs), field-programmable gate arrays (FPGAs), processors, microprocessors, controllers, microcontrollers (MCUs), or the like. Memory 260 may include any tangible memory apparatus, circuit, or device which, in some cases, may be integrated within host processor 210 as one chip. For example, memory 260 may include flip-flops, registers, Static Random Access Memory (SRAM), Nonvolatile RAM (NVRAM, such as "flash" memory), and/or Dynamic RAM (DRAM) such as synchronous DRAM (SDRAM), double data rate (e.g., DDR, DDR2, DDR3, etc.) SDRAM, read only memory (ROM), erasable ROM (EROM), erasable programmable ROM (EPROM), electrically erasable programmable ROM (EEPROM), etc. In other cases, memory 260 may also include one or more memory modules to which the memory devices are mounted, such as single inline memory modules (SIMMs), dual inline memory modules (DIMMs), etc. CAN transceiver 215 may provide a physical layer (PHY) interface.

FIG. 3 is a block diagram of CAN controller 230 (shown in FIG. 2) according to some embodiments. As shown, CAN controller 230 includes memory 305 and message processing engine or circuitry 310, which may be operably coupled to each other.

During normal operation, message processing engine 310 may cause one or more CAN messages provided by core 225 and/or stored in memory 305 to be transmitted over CAN bus 205 through CAN transceiver 215. Message processing engine 310 may also receive one or more CAN messages provided by CAN transceiver 215 from CAN bus 205, decode and/or translate those received messages, and perform some additional processing. For example, in some cases, message processing engine 310 may cause a received CAN message to be provided to core 225.

Additionally or alternatively, message processing engine 310 may compare the contents of a received CAN message (e.g., identification and/or data bits) against stored information (e.g., in memory 305) to determine whether to take some predetermined action in response to the received message, etc. For instance, message processing engine 310 may select, depending upon the result of the comparison, one of a plurality of response messages stored in memory 305 to be transmitted over CAN bus 205 corresponding to the received CAN message. Furthermore, the selection and transmission of such a response message may be performed autonomously and without intervention from core 225.

Memory 305 may be configured to buffer one or more received or transmitted CAN messages. In some cases, memory 305 may also be configured to store program instructions that allow message processing engine 310 to process a received CAN message according to one or more of a plurality of different message handling protocols when CAN controller 230 is operating under a corresponding one of a plurality of operating modes. Additionally or alternatively, memory 305 may be further configured to store instructions that allow engine 310 to implement certain operations described herein.

In some embodiments, the modules or blocks shown in FIG. 3 may represent processing circuitry and/or sets of software routines, logic functions, and/or data structures that, when executed by the processing circuitry, perform specified operations. Although these modules are shown as distinct logical blocks, in other embodiments at least some of the operations performed by these modules may be combined in to fewer blocks. Conversely, any given one of modules 305-310 may be implemented such that its operations are divided among two or more logical blocks. Although shown with a particular configuration, in other embodiments these various modules or blocks may be rearranged in other suitable ways.

Figure 4:
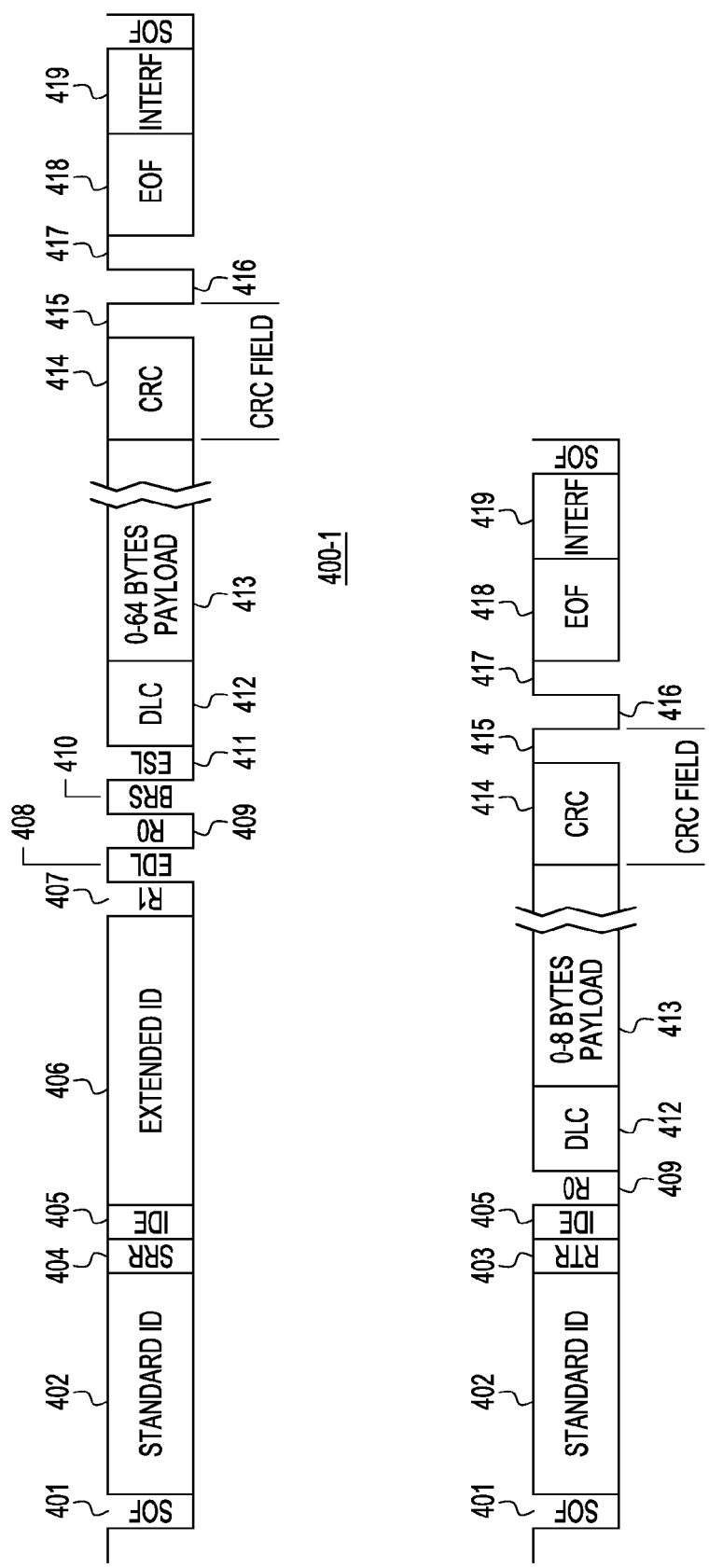
FIG. 4 is a diagram of examples of CAN data frames or messages configured to indicate internal transmitter errors according to some embodiments.

FIG. 4 is a diagram of CAN data frames or messages 400-1 and 400-2 configured to indicate internal transmitter errors according to some embodiments. In some examples, CAN data frame 400-1 may be used in CAN Flexible Data Rate (FD) applications, whereas CAN data frame 400-2 may be used in high or low speed CAN applications. Either of messages 400-1 or 400-2 may be exchanged between two or more of nodes or devices 115-170 in FIG. 1. The contents of the different fields of data frames 400-1 and 400-2 are outlined in Table I below:

In some embodiments, messages 400-1 or 400-2 may include modified CRC fields 414 and 415. The use of CRC fields 414 and 415 (instead of other fields, for example) is beneficial because CRC fields 414 and 415 are some of the last fields in a typical CAN data frame. As such, in addition or as an alternative to indicating other types of errors, the contents of CRC fields 414 and 415 may also be used to indicate internal transmitter errors. For instance, a transmitter node may invert all bits in the CRC fields in order to indicate an internal transmitter error. Again, these techniques are different from the conventional approach whereby a transmitter would cease transmission of the frame upon detection of the internal error, and in which case the event would be indistinguishable from a bus error condition.

In some cases, a subset of fewer than all bits in the CRC fields may be inverted in order to indicate a corresponding one of a plurality of different types of internal transmitter errors. Depending upon which bits are inverted, a different type of internal error may be communicated. For example, a different pattern of inverted bits of CRC fields 414-415 (e.g., every other bit, one or more bits every two or more bits, etc.) may encode a different internal transmitter error. Additionally or alternatively, different portions of CRC fields 414-415 (e.g., the first half and/or the second half of all bits, the first, second, or third portions of all bits, etc.) may be used for the same purpose.

Examples of internal transmitter errors include, but are not limited to, hardware errors detected in connection with memory read operations, memory write operations, memory access operations, etc. Depending upon the number of errors

TABLE I

| Field Name | Detail Number | Length (bits) | Description |
| --- | --- | --- | --- |
| Start-of-Frame (SOF) | 401 | 1 | Indicates the start of frame transmission |
| Standard ID | 402 | 11 | First part of a unique identifier for the data, which also represents the message priority |
| Remote Transmission Request (RTR) | 403 | 1 | A recessive bit (1) that serves as a placeholder. |
| Substitute Remote Request (SRR) | 404 | 1 | A recessive bit (1) that serves as a place holder |
| Identifier Extension Bit (IDE) | 405 | 1 | A recessive bit (1) that indicates more identifier bits follow |
| Extended ID | 406 | 18 | Second part of the unique identifier for the data, which also represents the message priority |
| Reserved Bit (R1) | 407 | 1 | A dominant bit (0) |
| Extended Data Length (EDL) | 408 | 1 | Reserved bits accepted as either dominant or recessive to distinguish between a standard CAN frame format and the CAN FD frame format |
| Reserved Bit (R0) | 409 | 1 | Number of bytes of data (0-8 bytes) |
| Bit Rate Switch (BRS) | 410 | 1 | The value of BRS decides whether the bit rate in the Data-Phase is the same as in the Arbitration-Phase (BRS dominant) or whether the predefined faster bit rate is used in the Data-Phase (BRS recessive) |
| Error State Indicator (ESI) | 411 | 1 | Dominant for error active and recessive for error passive |
| Data Length Code (DLC) | 412 | 4 | Data to be transmitted (length dictated by DLC field) |
| Data Payload | 413 | 0-64 | Actual data transmitted or received |
| Cyclic Redundancy Check (CRC) | 414 | 15 | Cyclic redundancy check |
| CRC Delimiter | 415 | 1 | A recessive bit (1) |
| Acknowledgement Bits (ACK) | 416 | 2 | Indicates acknowledgement of the integrity of the data |
| ACK Delimiter | 417 | 1 | A recessive bit (1) |
| End of Frame (EOF) | 418 | 7 | Marks the end of the current frame |
| Interframe Space (IFS) | 419 | 3 | Spacing between frames | to be encoded, a different encoding scheme may be used. For example, if a particular application only needs to distinguish between an internal error and a bus error condition, every bit in CRC fields 414-415 may be inverted to indicate the internal error. If one of two internal errors is conveyed, half of the bits in CRC fields 414-415 (or two different bit inversion patterns) may be used.

It should be noted that certain internal transmitter errors may take place or may be detected while the transmission of data frame 400 is ongoing but before CRC fields 414-415 are transmitted, such that CRC fields 414-415 may still be modified during the transmission data frame 400. As such, existing CAN protocol elements may be altered to insert transmitter error information, which may then be understood or decoded by a receiver node.

Figure 5:
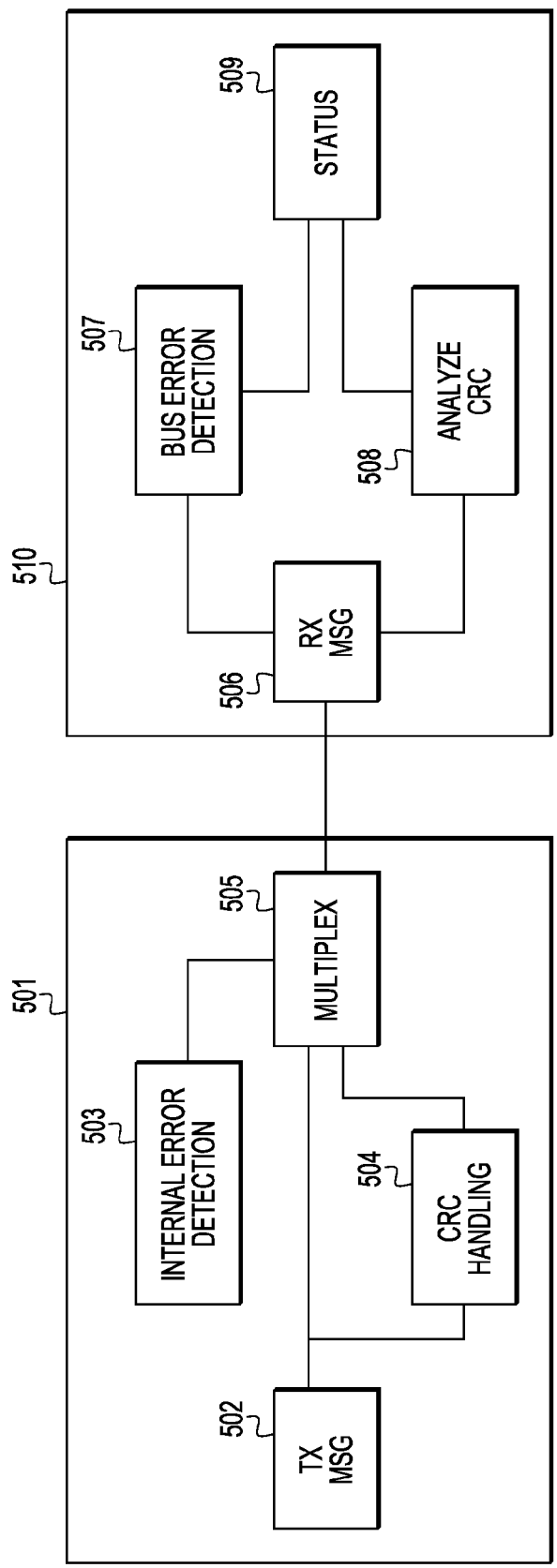
FIG. 5 is a block diagram of an example of a transmitter node and a receiver node operating in a CAN according to some embodiments.

FIG. 5 is a block diagram of an example of transmitter node 501 and receiver node 510 operating in a CAN network. In some embodiments, one or more of blocks 502-505 of transmitter node 501 may be included within an instance of message processing engine 310 of FIG. 3 when CAN controller implements a CAN transmitter, and one or more of blocks 506-509 of receiver node 510 may be included within an instance of message processing engine 310 when CAN controller 230 implements a CAN receiver.

In this example, transmitter node 501 includes message transmission module 502 configured to produce a data frame such as frame 400 of FIG. 4, and to provide that frame to CRC handling module 504 and to multiplexing module 505. CRC handling module 504 may be configured to invert all (or a portion of) bits in the data frame provided by message transmission module 502.

Internal error detection module 503 is configured to detect one or more internal transmitter errors and, in the presence of those errors, controls multiplexing module 505 to output the data frame with inverted CRC bits from CRC handling module 504 instead of the original CRC bits. As a result, in response to there having been an internal transmitter error, the data frame transmitted to receiver 510 includes altered CRC field(s) with inverted bits that encode information about that error. Again, this is in contrast with conventional error handling methods where transmitter 501 would simply halt transmission of the original data frame, and that would therefore cause an event indistinguishable from a bus error condition.

Receiver 510 includes message receiving module 506 coupled to bus error detection module 507 and to CRC analyzer module 508. During receipt of a data frame by module 506, if transmission stops mid-frame, for example, bus error detection module 507 indicates to status reporting module 509 that a bus error condition has been detected. Conversely, if an entire data frame is received, CRC analyzer module 508 continues to determine whether a predetermined portion of bits in that frame's CRC field is inverted and, if so, indicates that a corresponding internal transmitter error has occurred to status reporting module 509.

To further illustrate operation of transmitter 501 and receiver 510, assume a scenario where an error is detected when the ID field of a data frame is being transferred from RAM memory to the CAN bus by transmitter 501. At this point, the message cannot be aborted. Therefore, an error frame may be generated to prevent receiver 510 from receiving the corrupted message. Bits in the CRC fields may be inverted so that receiver 510 may use those bits to identify the transmitter internal error. Particularly, receiver 510 monitors the entire CRC fields and compares the received bits with calculated ones. If all CRC bits are detected as inverted, receiver 510 generates an error indication and/or sets a flag. This kind of error may then be used to distinguish between a CAN bus error and transmitter 501 being under an internal error condition. Moreover, the received message, although structurally correct, contains corrupted information due to the internal error detected during the RAM memory access, and may be rejected by the receiver upon the detection of the CRC field inversion.

As explained herein, in an illustrative, non-limited embodiment, a method may include initiating, by a device coupled to a CAN, transmission of a message via the CAN; detecting an error by the device during the transmission; and continuing, by the device after having detected the error, the transmission of the message without causing or indicating a bus error condition. In some implementations, detecting the error may include detecting a memory transfer error with respect to a memory within the device. For example, detecting the memory transfer error may occur after transmission of an identification field of the message over a CAN bus.

The method may include finishing the transmission of the message without causing or indicating the bus error condition. The method may also include indicating the error in at least one CRC field of the message. The method may further include inverting each bit in the CRC field and/or inverting a subset of bits in the CRC field. The method may also include indicating a corresponding type of failure internal of the device in the subset of bits.

In another illustrative, non-limiting embodiment, a CAN node may include message processing circuitry configured to receive a frame from a transmitter, the frame comprising a CRC field, the message processing circuitry further configured to identify an internal error of the transmitter based upon the CRC field.

In some implementations, the message processing circuitry may be configured to determine that each bit in the CRC field is inverted. Additionally or alternatively, the message processing circuitry may be configured to report the internal error as distinct from a bus error. Additionally or alternatively, the message processing circuitry may be configured to report the internal error as one of a plurality of different types of internal errors originated by the transmitter. Additionally or alternatively, the message processing circuitry may be configured to determine that a portion of the bits in the CRC field is inverted. For instance, a first portion of the inverted bits in the CRC field may correspond to a first type of internal error and a second portion of the inverted bits in the CRC field may correspond to a second type of internal error.

In yet another illustrative, non-limiting embodiment, a CAN may include a transmitter node configured to initiate transmission of a message, detect an error internal to the transmitter node during the transmission, modify a portion of the bits in a CRC field of the message in response to the detection, and continue the transmission of the message; and a receiver node coupled to the transmitter node, the receiver node configured to receive the message and to identify the error internal to the transmitter node based on the modified portion of the bits in the CRC field. The transmitter node may be configured to continue the transmission of the message without indicating a bus error.

In some cases, to modify the portion of the bits, the transmitter node may be configured to invert all bits in the CRC field. As such, the receiver node may be configured to determine that all bits in the CRC field are inverted. Additionally or alternatively, to modify the portion of the bits, the transmitter node may be configured to invert fewer than all bits in the CRC field. In these cases, the receiver node may be configured to identify which bits in the CRC field are inverted and to report the error as corresponding to one of a plurality of possible errors internal to the transmitter node.

It should be understood that the various operations described herein may be implemented by processing circuitry executing software, hardware, or a combination thereof. The order in which each operation of a given method is performed may be changed, and various elements of the systems illustrated herein may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The term "coupled" is defined as connected, although not necessarily directly, and not necessarily mechanically. The terms "a" and "an" are defined as one or more unless stated otherwise. The terms "comprise" and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
   initiating, by a device coupled to a Controller Area Network (CAN), transmission of a message via the CAN;
   detecting an error by the device during the transmission;
   including an indication of the error in at least one cyclic redundancy check (CRC) field of the message by inverting at least a subset of bits in the CRC field; and
   continuing, by the device after having detected the error, the transmission of the message without triggering a bus error condition.

2. The method of claim 1, wherein detecting the error includes detecting a memory transfer error with respect to a memory within the device.

3. The method of claim 2, wherein detecting the memory transfer error occurs after transmission of an identification field of the message over a CAN bus.

4. The method of claim 1, further comprising finishing the transmission of the message without causing or indicating the bus error condition.

5. The method of claim 1, further comprising inverting each bit in the CRC field.

6. The method of claim 1, further comprising indicating a corresponding type of failure internal of the device in the subset of bits.

7. A Controller Area Network (CAN) node, comprising:
   message processing circuitry configured to receive a frame from a transmitter, the frame comprising a cyclic redundancy check (CRC) field, the message processing circuitry further configured to identify an internal error of the transmitter based upon the CRC field by determining that at least a subset of bits in the CRC field is inverted.

8. The CAN node of claim 7, wherein the message processing circuitry is configured to determine that each bit in the CRC field is inverted.

9. The CAN node of claim 7, wherein the message processing circuitry is configured to report the internal error as distinct from a bus error.

10. The CAN node of claim 7, wherein the message processing circuitry is configured to report the internal error as one of a plurality of different types of internal errors originated by the transmitter.

11. The CAN node of claim 7, wherein a first portion of the inverted bits in the CRC field corresponds to a first type of internal error and wherein a second portion of the inverted bits in the CRC field corresponds to a second type of internal error.

12. A Controller Area Network (CAN), comprising:
   a transmitter node configured to initiate transmission of a message, detect an error internal to the transmitter node during the transmission, modify a portion of the bits in a CRC field of the message in response to the detection, and continue the transmission of the message; and
   a receiver node coupled to the transmitter node, the receiver node configured to receive the message and to identify the error internal to the transmitter node based on the modified portion of the bits in the CRC field.

13. The CAN of claim 12, wherein the transmitter node is configured to continue the transmission of the message without indicating a bus error.

14. The CAN of claim 12, wherein to modify the portion of the bits, the transmitter node is configured to invert all bits in the CRC field.

15. The CAN of claim 14, wherein the receiver node is configured to determine that all bits in the CRC field are inverted.

16. The CAN of claim 12, wherein to modify the portion of the bits, the transmitter node is configured to invert fewer than all bits in the CRC field.

17. The CAN of claim 16, wherein the receiver node is configured to identify which bits in the CRC field are inverted and to report the error as corresponding to one of a plurality of possible errors internal to the transmitter node.

* * * * *